(12) United States Patent
Adams et al.

(10) Patent No.: US 7,765,293 B2
(45) Date of Patent: Jul. 27, 2010

(54) SYSTEM AND ALGORITHM FOR MONITORING EVENT SPECIFICATION AND EVENT SUBSCRIPTION MODELS

(75) Inventors: Gregory D. Adams, Dunrobin (CA); Michael Wayne Brown, Georgetown, TX (US); Stefan Georg Derdak, San Jose, CA (US); Friedemann Schwenkreis, Leinfelden-Echterdingen (DE)

(73) Assignee: International Business Machines Corporation, Armonk, NY (US)

( * ) Notice: Subject to any disclaimer, the term of this patent is extended or adjusted under 35 U.S.C. 154(b) by 1252 days.

(21) Appl. No.: 11/314,471

(22) Filed: Dec. 21, 2005

(65) Prior Publication Data

US 2007/0174844 A1 Jul. 26, 2007

(51) Int. Cl.
*G06F 15/173* (2006.01)
*G06F 3/00* (2006.01)
(52) U.S. Cl. .................. 709/224; 709/223; 719/318
(58) Field of Classification Search ......... 709/223–224; 719/318; 379/127.03, 142.03, 207.02; 707/100
See application file for complete search history.

(56) References Cited

U.S. PATENT DOCUMENTS

| | | | |
|---|---|---|---|
| 6,473,895 B1 | 10/2002 | Lopes et al. | 717/128 |
| 2002/0138571 A1 | 9/2002 | Trinon et al. | 709/204 |
| 2002/0188643 A1 | 12/2002 | Kennedy | 709/1 |
| 2003/0131343 A1 | 7/2003 | French et al. | 717/127 |
| 2004/0030778 A1 | 2/2004 | Kronenberg et al. | 709/224 |
| 2004/0117802 A1 | 6/2004 | Green | 719/318 |
| 2004/0139446 A1 | 7/2004 | Hope et al. | 719/318 |
| 2006/0059107 A1* | 3/2006 | Elmore et al. | 705/64 |

OTHER PUBLICATIONS

Andreozzi et al. (CHEP04, Interlaken (CH), Sep. 2004) Design and Implementation of a Notification Model for Grid Monitoring Events, pp. 911-914.*
McGarrahan, "WebSphere Business Integration Monitor Version 6 and Beyond", WebSphere Software Platform Inner Circle Conference—2005, IBM Software Group, pp. 1-21.
Erpenbach, "Adminsitrating and Monitoring business Integration Solutions—The eXchange Case Study", WebSphere Software Platform Inner Circle Conference—2005, IBM Software Group, pp. 1-27.
Herness, "WBI—Strategy, Direction and Architecture", IBM Software Group, pp. 1-84.

* cited by examiner

*Primary Examiner*—Peling A Shaw
(74) *Attorney, Agent, or Firm*—Yee & Associates, P.C.; Prentiss W. Johnson

(57) ABSTRACT

A computer implemented method, data processing system, and computer program product for monitoring event specification and monitoring event subscription. Monitorable events are defined in a context of execution of a monitored component. Monitorable points of execution of the monitored component are identified, wherein events can be generated from the monitorable points. Possible events that can be generated in the identified monitorable points are then identified to define the monitorable events.

15 Claims, 14 Drawing Sheets

*FIG. 4A*          400

```
<?xml version="1.0" encoding="UTF-8"?>
<xs:schema
  xmlns:xs="http://www.w3.org/2001/XMLSchema"
  xmlns="http://www.ibm.com/xmlns/prod/websphere/monitoring/6.0.0/mes"
  targetNamespace="http://www.ibm.com/xmlns/prod/websphere/monitoring/6.0.0/mes"
  elementFormDefault="qualified"
>

<xs:annotation>
    <xs:documentation>
      This schema is for monitorable elements specification.
      Each component kind has to provide for a .mes file that corresponds to this schema.
    </xs:documentation>
  </xs:annotation>                    402

<xs:complexType name="EventNaturesSpecType">
    <xs:sequence>
      <xs:element name="Property" minOccurs="0" maxOccurs="unbounded">
        <xs:simpleType>         404
          <xs:restriction base="xs:string">
            <xs:enumeration value="Audit"/>   410
            <xs:enumeration value="CEI"/>    412
            <!--
              All components supporting CBE event publishing must specify this property in their .mes file
            -->
          </xs:restriction>
        </xs:simpleType>        406
      </xs:element>
      <xs:element name="ComponentKind" type="xs:string" minOccurs="0"/>
      <xs:element name="ElementKind" type="ElementKind" minOccurs="0" maxOccurs="unbounded"/>
    </xs:sequence>              408
    <xs:attribute name="name" type="xs:QName"/>
    <xs:attribute name="targetNamespace" type="xs:string"/>
    <xs:attribute name="shortName" type="xs:string" />
  </xs:complexType>
```

FIG. 4B

```
<xs:complexType name="ElementKind">
    <xs:sequence>
        <xs:element name="LocationPattern" type="LocationPattern" minOccurs="0" maxOccurs="1"/>
        <xs:element name="EventNature" type="EventNature" minOccurs="0" maxOccurs="unbounded"/>
    </xs:sequence>
    <xs:attribute name="name"/>
    <xs:attribute name="default" use="optional" type="xs:boolean" default="false"/>
    <!--
        If .mon is not deployed for a component default="true" means that all event natures are to be fired for
        that component with the DIGEST payload
        If .mon is deployed for a component the default attribute is meaningless
    -->
</xs:complexType>

<xs:complexType name="EventNature">
    <xs:attribute name="name"/>
    <xs:attribute name="eventName" type="xs:string" use="required"/>
</xs:complexType>

<xs:complexType name="LocationPattern">
    <xs:attribute name="elementPath" type="xs:string"/>
    <xs:attribute name="namePath" type="xs:string"/>
</xs:complexType>

<xs:element name="EventNaturesSpec" type="EventNaturesSpecType"/>
</xs:schema>
```

FIG. 5A

```xml
<?xml version="1.0" encoding="UTF-8"?>
<xs:schema
    xmlns:xs="http://www.w3.org/2001/XMLSchema"
    xmlns="http://www.ibm.com/xmlns/prod/websphere/monitoring/6.0.0/es"
    targetNamespace="http://www.ibm.com/xmlns/prod/websphere/monitoring/6.0.0/es"
    elementFormDefault="qualified"
>

<xs:annotation>
        <xs:documentation>
            This schema is for monitorable elements specification.
            Each component kind has to provide for a .mes file that corresponds to this schema.
        </xs:documentation>
    </xs:annotation>
    <xs:complexType name="EventSpecType">               /⎯ 502
        <xs:sequence>                       ⎯504
            <xs:element name="Events" type="EventsType" minOccurs="0" maxOccurs="1"/>
        </xs:sequence>                              ⎯506
        <xs:attribute name="name" type="xs:QName"/>
        <xs:attribute name="targetNamespace" type="xs:string"/>
    </xs:complexType>

<xs:complexType name="EventsType">    /⎯506
        <xs:sequence>                  ⎯508
            <xs:element name="Event" type="EventType" minOccurs="0" maxOccurs="unbounded"/>
        </xs:sequence>                               ⎯510
    </xs:complexType>

<xs:complexType name="EventType">    /⎯510
        <xs:sequence>                  ⎯512
            <xs:element name="Payload" type="PayloadType" minOccurs="0" maxOccurs="unbounded"/>
        </xs:sequence>  514    /⎯516           ⎯513
        <xs:attribute name="name" type="xs:string" use="required"/>
        <xs:attribute name="parent" type="xs:string" use="optional"/>
        <!-- refName and from must both be present if used -->
        <xs:attribute name="refName" type="xs:string" use="optional"/>
        <xs:attribute name="from" type="xs:QName" use="optional"/>
        <xs:attribute name="situationType" type="xs:string" use="optional"/>
522
        <xs:attribute name="situationCategory" type="xs:string" use="optional"/>
        <xs:attribute name="reasoningScope" type="xs:string" use="optional"/>
    </xs:complexType>             526       ⎯524

<xs:complexType name="PayloadType">
        <xs:sequence>                  ⎯513
            <xs:element name="Data" type="Data" minOccurs="0" maxOccurs="unbounded"/>
        </xs:sequence>                 ⎯528
        <xs:attribute name="name" default="DEFAULT"/>
    </xs:complexType>
```

*FIG. 5B*   528   500

```
<xs:complexType name="Data">
    <xs:sequence>                            ~530
        <xs:element name="children" type="Data" minOccurs="0" maxOccurs="unbounded"/>
    </xs:sequence>                           ~532
    <xs:attribute name="role" use="optional">
    <!-- attribute role is not needed if name is available -->
        <xs:simpleType>
            <xs:restriction base="xs:string">
                <xs:maxLength value="64"></xs:maxLength>
            </xs:restriction>
        </xs:simpleType>    534
    </xs:attribute>
    <xs:attribute name="name"></xs:attribute>
    <xs:attribute name="type" use="required">
        <xs:simpleType>
            <xs:list>         536
                <xs:simpleType>
                    <xs:restriction base="xs:string">
                        <xs:maxLength value="64"></xs:maxLength>
                        <!-- Added type noValue when only a children is specified. -->
                        <!-- With a new type noValue, the value is ignored and only the children are
                        considered. V1.1 Approved -->
                        <xs:enumeration value="noValue"/>      ~538
                        <xs:enumeration value="byte"/>         ~540
                        <xs:enumeration value="short"/>        ~542
                        <xs:enumeration value="int"/>          ~544
                        <xs:enumeration value="long"/>         ~546
                        <xs:enumeration value="float"/>        ~548
                        <xs:enumeration value="double"/>       ~550
                        <xs:enumeration value="string"/>       ~552
                        <xs:enumeration value="dateTime"/>     ~554
                        <xs:enumeration value="boolean"/>      ~556
                        <xs:enumeration value="primitive"/>    ~558
                        <xs:enumeration value="businessObject"/> ~560
                        <xs:enumeration value="exception"/>    ~562
```

FIG. 5C

```
                                            500
                                           /
              <xs:enumeration value="byteArray"/> ⟋564
              <xs:enumeration value="shortArray"/> ⟋566
              <xs:enumeration value="intArray"/> ⟋568
              <xs:enumeration value="longArray"/> ⟋570
              <xs:enumeration value="floatArray"/> ⟋572
              <xs:enumeration value="doubleArray"/> ⟋574
              <xs:enumeration value="stringArray"/> ⟋576
              <xs:enumeration value="dateTimeArray"/> ⟋578
              <xs:enumeration value="booleanArray"/> ⟋580
              <xs:enumeration value="primitiveArray"/> ⟋582
              <xs:enumeration value="businessObjectArray"/> ⟋584
              <xs:enumeration value="hexBinary"/> ⟋586
              <xs:minLength value="1"> </xs:minLength>
            </xs:restriction>
          </xs:simpleType>
        </xs:list>
      </xs:simpleType>
    </xs:attribute>
    <xs:attribute name="minOccurs" default="1">
      <xs:simpleType>
        <xs:restriction base="xs:string">
          <xs:enumeration value="0"/>
          <xs:enumeration value="1"/>
          <xs:enumeration value="unbounded"/>
        </xs:restriction>
      </xs:simpleType>
    </xs:attribute>
    <xs:attribute name="maxOccurs" default="1">
      <xs:simpleType>
        <xs:restriction base="xs:string">
          <xs:enumeration value="0"/>
          <xs:enumeration value="1"/>
          <xs:enumeration value="unbounded"/>
        </xs:restriction>
      </xs:simpleType>
    </xs:attribute>
  </xs:complexType>

<xs:element name="EventSpec" type="EventSpecType"/>
</xs:schema>
```

1- The EventNatures specificiation
```
<?xml version="1.0" encoding="UTF-8"?>
<EventNaturesSpec                                              — 602
    name="EventNatures"    — 603
    targetNamespace="http://www.ibm.com/xmlns/prod/websphere/scdl/6.0.0:Component"
    xmlns="http://www.ibm.com/xmlns/prod/websphere/monitoring/6.0.0/mes"
    shortName="SCA"
>
```
604
606 — `<Property>CEI</Property>`
    `<ElementKind name="MethodInvocation">`          614
608 — `<EventNature name="ENTRY" eventName="WBI.JService.MethodInvocation.ENTRY"/>`
610 — `<EventNature name="EXIT" eventName="WBI.JService.MethodInvocation.EXIT"/>` — 616
    `<EventNature name="FAILURE" eventName="WBI.JService.MethodInvocation.FAILURE"/>`
612 — `</ElementKind>`
    `</EventNaturesSpec>`                          618

FIG. 6B

2- The Events specification: ⟋ 620
```xml
<?xml version="1.0" encoding="UTF-8"?>
<EventSpec   ⟋ 622
    xmlns="http://www.ibm.com/xmlns/prod/websphere/monitoring/6.0.0/es"
    name="Events"
    targetNamespace="http://www.ibm.com/xmlns/prod/websphere/scdl/6.0.0:Component"
    xmlns:er="http://www.ibm.com/xmlns/prod/websphere/monitoring/6.0.0/es/eventpayloads"
    >
```

626    `<Events>` ⟋ 624
      `<Event name="WBI.JService.MethodInvocation.ENTRY" situationType="Report"`
        `situationCategory="ReportCategory" reasoningScope="external">`

634 ⸺ `<Payload name="DEFAULT">`

636 ⸺ `<Data role="Input" type="primitive businessObject" minOccurs="0" maxOccurs="unbounded"/>`
                           638           640
         `</Payload>`
      `</Event>`

628 ⸺ `<Event name="WBI.JService.MethodInvocation.EXIT" situationType="Report"`
       `situationCategory="ReportCategory" reasoningScope="external">`

642 ⸺ `<Payload>`

644 ⸺ `<Data role="Output" type="primitive businessObject" minOccurs="0" maxOccurs="unbounded"/>`
                           646           648
         `</Payload>`
      `</Event>`

630 ⟋ `<Event name="WBI.ER" refName="WBI.ErrorReport" from="er:ITEvents"/>`

632 ⟋ `<Event name="WBI.JService.MethodInvocation.FAILURE" parent="WBI.ER" situationType=`
      `"Report" situationCategory="ReportCategory" reasoningScope="external">`

650 ⸺ `<Payload>`

652 ⸺ `<Data role="Input" type="primitive businessObject" minOccurs="0" maxOccurs="unbounded"/>`
                           654           656
         `</Payload>`
      `</Event>`
    `</Events>`
  `</EventSpec>`

*FIG. 7A*

1- The EventNatures specification

```
<?xml version="1.0" encoding="UTF-8"?>
<EventNaturesSpec
    xmlns="http://www.ibm.com/xmlns/prod/websphere/monitoring/6.0.0/mes"
    name="EventNatures"
    targetNamespace="http://www.ibm.com/xmlns/prod/websphere/wbiserver/map/
6.0.0:BusinessObjectMap"
    shortName="MAP"
    >
    <Property>CEI</Property>
    <ElementKind name="MAP">
        <LocationPattern elementPath="/businessObjectMap" namePath="/"/>
        <EventNature name="ENTRY" eventName="WBI.MAP.ENTRY"/>
        <EventNature name="EXIT" eventName="WBI.MAP.EXIT"/>
        <EventNature name="FAILURE" eventName="WBI.MAP.FAILURE"/>
    </ElementKind>
    <ElementKind name="Transformation">
        <LocationPattern elementPath="/businessObjectMap/propertyMap" namePath=
"/propertyMap[@id]"/>
        <EventNature name="ENTRY" eventName="WBI.MAP.Transformation.ENTRY"/>
        <EventNature name="EXIT" eventName="WBI.MAP.Transformation.EXIT"/>
        <EventNature name="FAILURE" eventName="WBI.MAP.Transformation.FAILURE"/>
    </ElementKind>
</EventNaturesSpec>
```

2- The Events specification

FIG. 7B

```xml
<?xml version="1.0" encoding="UTF-8"?>
<EventSpec                                                                           752
    xmlns="http://www.ibm.com/xmlns/prod/websphere/monitoring/6.0.0/es"
    xmlns:er="http://www.ibm.com/xmlns/prod/websphere/monitoring/6.0.0/es/eventpayloads"
    name="Events"
    targetNamespace="http://www.ibm.com/xmlns/prod/websphere/wbiserver/map/6.0.0:BusinessObjectMap"
    >
                                                                      755
    <Events>       754
756    <Event name="WBI.MAP.ENTRY" parent="WBI.MonitoringEvent" situationType="Report"
        situationCategory="ReportCategory" reasoningScope="external">
770       <Payload>          774
772          <Data role="Input" type="businessObject" maxOccurs="unbounded"/>
          </Payload>                          759
                                       776
       </Event>
758    <Event name="WBI.MAP.EXIT" parent="WBI.MonitoringEvent" situationType="Report"
        situationCategory="ReportCategory" reasoningScope="external">
778       <Payload>
780          <Data role="Output" type="businessObject" maxOccurs="1"/>
          </Payload>                                          761
       </Event>             782         784
760    <Event name="WBI.MAP.Transformation.ENTRY" parent="WBI.MonitoringEvent" situationType="Report"
        situationCategory="ReportCategory" reasoningScope="external">
763       <Payload name="DEFAULT">
765          <Data role="Input" type="primitive businessObject" minOccurs="0" maxOccurs="unbounded"/>
          </Payload>
       </Event>              767             771
762    <Event name="WBI.MAP.Transformation.EXIT" parent="WBI.MonitoringEvent" situationType="Report"
        situationCategory="ReportCategory" reasoningScope="external">
775       <Payload>                                                 773
777          <Data role="Output" type="primitive businessObject" maxOccurs="1"/>
          </Payload>
       </Event>              779             781
764    <Event name="WBI.MAP.Transformation.FAILURE" parent="WBI.MonitoringEvent" situationType="Report"
        situationCategory="ReportCategory" reasoningScope="external">
785       <Payload>          793             795          783
787          <Data role="Input" type="primitive businessObject" minOccurs="0" maxOccurs="unbounded"/>
789          <Data role="Output" type="primitive businessObject" maxOccurs="1"/>
                              797             799
791          <Data role="Exception" type="exception" maxOccurs="1"/>
          </Payload>
       </Event>              711             713
766    <Event name="WBI.ER" refName="WBI.ErrorReport" from="er:ITEvents"/>
768    <Event name="WBI.MAP.FAILURE" parent="WBI.ER" situationType="Report"
        situationCategory="ReportCategory" reasoningScope="external">
786       <Payload>          792             794       769
788          <Data role="Input" type="primitive businessObject" minOccurs="0" maxOccurs="unbounded"/>
790          <Data role="Output" type="primitive businessObject" maxOccurs="1"/>
          </Payload>
       </Event>              796             798
    </Events>
</EventSpec>                                                          750
```

```xml
<?xml version="1.0" encoding="UTF-8"?>
<xs:schema
    xmlns:xs="http://www.w3.org/2001/XMLSchema"
    xmlns="http://www.ibm.com/xmlns/prod/websphere/monitoring/6.0.0/mon"
    targetNamespace="http://www.ibm.com/xmlns/prod/websphere/monitoring/6.0.0/mon"
    elementFormDefault="qualified"
    >

<xs:annotation>
        <xs:documentation>
            Schema for monitoring annotations.
            A monitoring annotation will have the file extension .mon
        </xs:documentation>
    </xs:annotation>

<xs:element name="Monitor">                    /* 802
        <xs:complexType >
            <xs:sequence>
804 ~       <xs:element name="EnableDefaultEvents" type="xs:boolean" default="true"
    minOccurs="0" maxOccurs="1"/>       ~806        ~808
                <xs:element name="Attributes" type="MapType" minOccurs="0"/>
810 ~       <xs:element name="Perspective" type="xs:string" minOccurs="0" default="BUSINESS
    RELEVANT"/>
        812 /<xs:element name="EventSource" type="EventSourceType" maxOccurs="unbounded"/>
            </xs:sequence>                                      ~814
            <xs:attribute name="kind" type="xs:string"/>
            <xs:attibute name="name" type="xs:string"/>
            <xs:attribute name="targetName" type="xs:string"/>
            <xs:attribute name="targetNamespace" type="xs:string"/>
        </xs:complexType>
    </xs:element>

<xs:complexType name="EventSourceType"> /* 814
        <xs:sequence>
816 /<xs:element name="Name" type="xs:string"/>
818 /<xs:element name="Property" minOccurs="0" maxOccurs="unbounded">
            <xs:simpleType>
                <xs:restriction base="xs:string">
        822 /   <xs:enumeration value="Audit"/>
        824 /   <xs:enumeration value="Persistent"/>
        826 /   <xs:enumeration value="CEI"/>
        828 /   <xs:enumeration value="Queryable"/>
                </xs:restriction>
            </xs:simpleType>
        </xs:element>
            <xs:element name="Event" type="EventType" minOccurs="0" maxOccurs="unbounded"/>
        </xs:sequence>          ~820        ~830
    </xs:complexType>
```

```
                                                  800
                                              ↙
<xs:complexType name="EventType">  ╱─830
    <xs:attribute name="name" type="xs:string"/>  ╱─832
    <xs:attribute name="label" type="xs:string" use="optional"/>  ╱─834
    <xs:attribute name="active" type="xs:boolean" use="optional" default="true"/>  ╱─836
    <xs:attribute name="payload" type="xs:string" use="optional" default="digest"/>  ╲─838
    <xs:attribute name="tx" type="TXType" use="optional" default="SAME"/>
</xs:complexType>               ╲─840     ╲─842

<xs:simpleType name="TXType">  ╲─842
    <xs:restriction base="xs:string">
        <xs:enumeration value="SAME"/>  ⎤
        <xs:enumeration value="NEW"/>   ⎬ 844
        <xs:enumeration value="NONE"/>  ⎦
    </xs:restriction>
</xs:simpleType>

<xs:complexType name="MapType">  ╱─808
    <xs:sequence>
        <xs:element name="Entry" type="AssociationType" minOccurs="0" maxOccurs="unbounded"/>
    </xs:sequence>              ╲─846                ╲─848
</xs:complexType>
                              ╱─848
<xs:complexType name="AssociationType">
    <xs:attribute name="key" type="xs:string"/>  ╱─850
    <xs:attribute name="value" type="xs:string"/>  ╲─852
</xs:complexType>

</xs:schema>
```

FIG. 9

```
                                                                  900
    <?xml version="1.0" encoding="UTF-8"?>
902 <Monitor xmlns="http://www.ibm.com/xmlns/prod/websphere/monitoring/6.0.0/mon"
        kind="http://www.ibm.com/xmlns/prod/wbl/Map/6.0.0:BusinessObjectMap"
904     name="ClarifyToGenenicAddress"
        targetName="ClarifyToGenericAddress"
        targetNamespace="http://www.ibm.com.wbi/mapservice/test/jts/
        testmap:ClarifyToGenericAddress"
        >

906    <EventSource>
           <Name>MAP:/</Name>
908        <Event
               name="FAILURE"           910
               label="my map execution"
               active="true"
               payload="DIGEST"          914
               tx-="NEW"/>
                                         912
       </EventSource>

916    <EventSource>
           <Name>Transformation:/11</Name>
           <Event>
               name="FAILURE"           918
               payload="DIGEST"          926
               tx="NEW"/>
                                         924

<Event>
               name="ENTRY"             920
               label="my hand coded transformation entry"
               active="true"
               payload="DIGEST"/>
                                         928

<Event>
               name="EXIT"              922
               label="my hand coded transformation exit"
               active="false"
               payload="DIGEST"/>
                                         930
       </EventSource>
   </Monitor>
```

SYSTEM AND ALGORITHM FOR MONITORING EVENT SPECIFICATION AND EVENT SUBSCRIPTION MODELS

BACKGROUND OF THE INVENTION

1. Field of the Invention

The present invention relates generally to an improved data processing system, and in particular, to a computer implemented method, data processing system, and computer program product for monitoring event specification and monitoring event subscription.

2. Description of the Related Art

Currently, customers who want to monitor their business and information technology solutions are required to monitor services that execute these solutions. The monitored services enable or hook into all aspects of hardware, middleware, and application stacks to execute these solutions. The generation of monitoring events as a result of monitoring services leads to development of additional services, such as enterprise dashboards and on-demand services, which drive the resolution of monitored problems. In addition, these additional services may provide a mine for business opportunities, an audit of service agreements, an archive of important transactions, and extend third party applications.

Monitoring events may be generated in order to describe important aspects of the execution of a request all the way from the origination point to the completion point. The generated events are typically used for Business Process Monitoring (BPM) and Technical (IT) Monitoring. Business Process Monitoring uses the generated events to provide audit and business performance analysis, while Technical monitoring uses the generated event to support problem determination and performance tuning. However, existing monitoring systems provide limited capabilities in the monitoring of services.

SUMMARY OF THE INVENTION

Embodiments of the present invention provide a computer implemented method, data processing system, and computer program product for monitoring event specification and monitoring event subscription. Monitorable events are defined in a context of execution of a monitored component. Monitorable points of execution of the monitored component are identified, wherein events can be generated from the monitorable points. Possible events that can be generated in the identified monitorable points are then identified. Monitoring applications may subscribe to any subset of the available events.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 4A-4B illustrate a schema defining an EventNatures document in accordance with an illustrative embodiment of the present invention;

FIGS. 5A-5C illustrate a schema defining an Events document in accordance with an illustrative embodiment of the present invention;

FIG. 6A illustrates an exemplary extensible markup language file representing an EventsNature document for a component kind in accordance with an illustrative embodiment of the present invention;

FIG. 6B illustrates an exemplary extensible markup language file representing an Events document for a component kind in accordance with an illustrative embodiment of the present invention;

FIG. 7A illustrates an exemplary extensible markup language file representing an EventsNature document for the component kind maps in accordance with an illustrative embodiment of the present invention;

FIG. 7B illustrates an exemplary extensible markup language file representing an Events document for the component kind maps in accordance with an illustrative embodiment of the present invention;

FIGS. 8A-8B illustrate a schema for formalizing a monitoring event subscription model in accordance with an illustrative embodiment of the present invention; and FIG. 9 illustrates an exemplary extensible markup language file representing an event subscription in accordance with an illustrative embodiment of the present invention.

DETAILED DESCRIPTION OF THE PREFERRED EMBODIMENT

Figure 1:
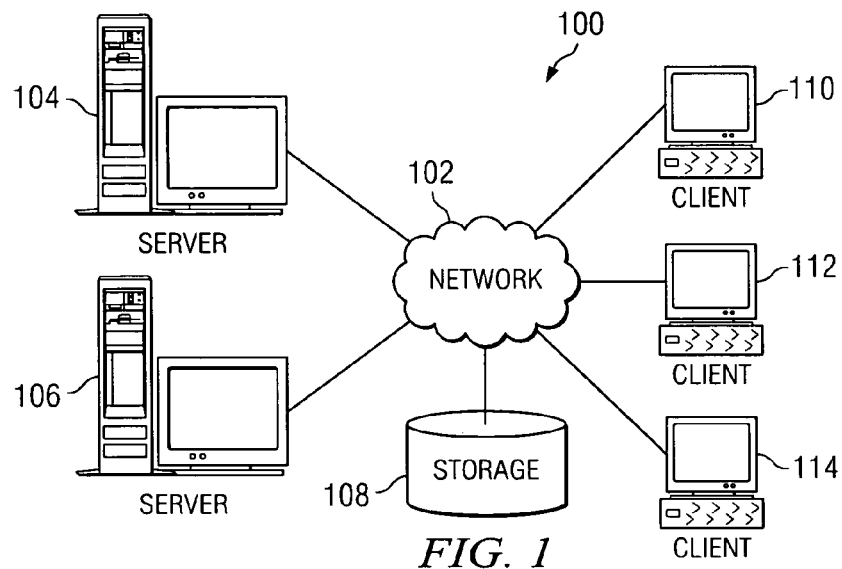
FIG. 1 depicts a pictorial representation of a network of data processing systems in which aspects of the present invention may be implemented.
Figure 2:
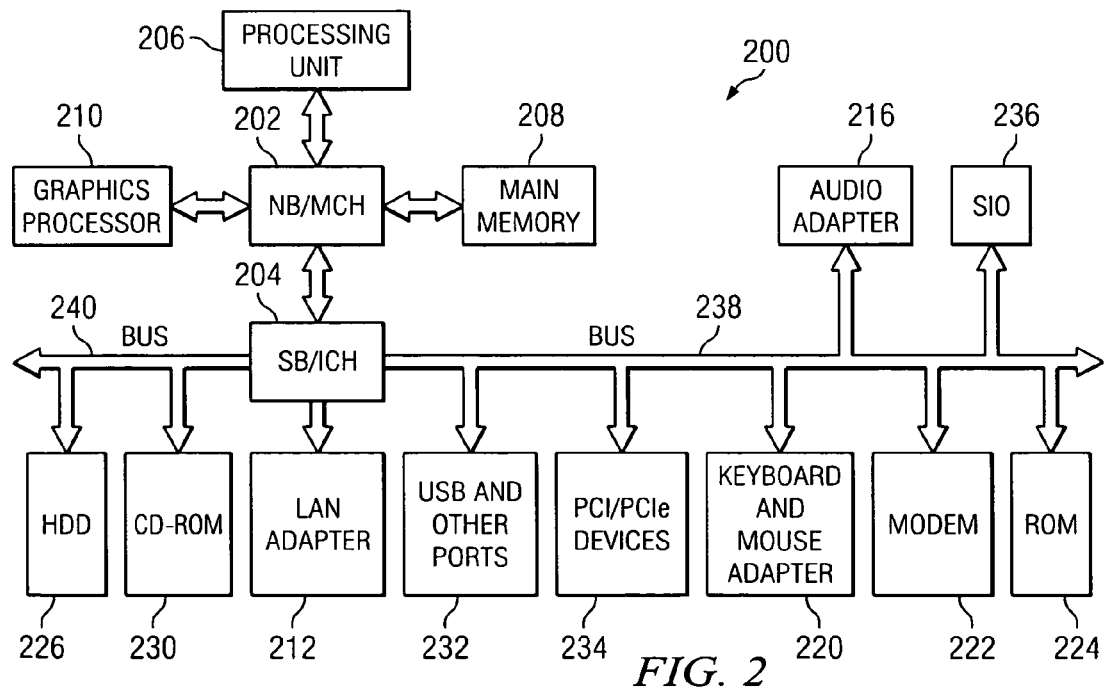
FIG. 2 is a block diagram of a data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives, and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communications unit may include one or more devices used to transmit and receive data, such as modem 222 or LAN adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Aspects of the present invention provide a monitoring event specification that enables users to specify, for various components of an application, monitorable points of execution and possible events at each monitorable point of execution. The monitoring event specification provides an observability contract between a service provider of a service and observers of the service. It should be noted that in the illustrative examples, the monitoring event specification may be implemented using a monitoring event specification model, and the monitoring event specification model is independent from the implementation language of the monitored application. The monitored components may be implemented in various languages, scripting languages, or declarative specifications.

With the monitoring event specification model, monitoring service tooling may be provided for developers, administrators, operators, dashboard users, and the like. The monitoring event specification model may also be implemented at all transitional points within and around the traditional stacks that host business solutions in a heterogeneous environment, for example, the hardware, middleware, and application stacks.

In the illustrative embodiment, the mechanism of the present invention is described in the context of a service oriented architecture (as shown below in FIG. 3), such as the service oriented architecture provided in IBM WebSphere Process Server. In this context, the software is organized as services provided by components. Components that provide business services are programmed/scripted based on the type of component, or "ComponentKind". For each ComponentKind, a monitoring event specification is provided which defines the observability of a ComponentKind. In other words, the monitoring event specification defines the possible events that may be generated for any component of the particular ComponentKind.

The monitoring event specification in these examples is composed of a monitoring event specification document. The monitoring event specification document may comprise an EventNatures and an Events document. The EventNatures document may be an extensible markup language (XML) file that specifies the monitorable points of execution and the Events that may be triggered from every monitorable point. A monitorable point of execution is a location in the execution of the component of a type the possible monitorable events may be generated. The Events document may be an XML file that specifies the data detail of each possible event for the ComponentKind.

Within the monitoring event specification model, a number of monitoring characteristics may be specified. These include the type of component monitored (ComponentKind), type of the monitorable element (ElementKind), the events available for the monitorable ElementKind, payload specification of the events, a security model policy, quality of service, target event bus, and other properties.

The ComponentKind is used to indicate the type of the component being monitored, for example, a service, a business process execution language (BPEL) workflow, a data-map, and the like. ElementKind is used to indicate the type of element being monitored, for example, public methods of a service, assignment of a variable, and the like. Examples of events available for an ElementKind (e.g., for the elementkind operation, may include operation requested, operation failed, and operation timed out. Payload specification of the events indicates data type and content specification of the events that are associated with the element type being monitored.

The quality of service specifies the level of service for monitoring the events. Examples of quality of service include audit, archive, system management, and policies. Audit quality of service provides monitoring of data in audit quality in terms of reliability. System management quality of service provides monitoring of data of quality in terms of reliability to support load balancing and other system management metrics. Other quality of service policies may specify monitoring according to a security model, performance prioritization, payload policy, and the like. Examples of a security model include data encryption model, key management model, and the like. Examples of performance prioritization include gold and silver models. Payload policy governs the possibility to publish more or less data detail. Event bus specifies the target event bus where to publish the monitoring events. Other properties may include a set of properties that is specific for a particular monitored artifact type. These properties include tooling hints and author options.

In an illustrative embodiment, the monitoring event specification model may be implemented by a standardized monitoring specification, which defines a subset of possible monitoring characteristics. Aspects of the present invention provide such a standardized monitoring specification for component kinds. One illustrative implementation specifies what events can be generated for a component of that type and where in the execution of the component of that type the events are generated.

In one illustrative implementation, the monitoring event specification model specifies the ComponentKind of the model, a list of ElementKinds, a list of possible events, and a list of data elements. Examples of the ComponentKind include a service, a BPEL workflow, a data-map, and the like. Each ElementKind in the list of ElementKinds is defined by a name, properties, a location pattern for each ElementKind, and a list of EventNatures. The location pattern is a generic Xpath query-like construct that identifies the ElementKind within a component script. Each EventNature is defined by a name and the name of the event to trigger. Examples of EventNatures include ENTRY, EXIT, and the like. Each possible event in the list of possible events is defined by a name, a parent event name, a payload specification, and common base event attributes, such as, situation type, situation category, and reasoning scope. Each data element in the list of data elements is defined by a role, such as input and output, a name, such as failure reason, and a type, such as a simple type, Java™ object, or standard data object.

Aspects of the present invention also provide a monitoring event subscription model that allows the monitoring applications (and observer applications) to specify formally the events the applications want to monitor. With the monitoring event subscription model, monitoring applications may express what events they want to monitor, such as a particular service request (e.g., when an operation occurs, completes, or fails) or an "important" point of the execution of a workflow (e.g., "insurance claim approved". It should be noted that the monitored applications may be implemented in various languages, scripting languages, or declarative specifications, and the monitoring event subscription model is independent from the language of the monitored application.

General usage of the monitoring event subscription model includes a prerequisite that the monitored application is of a ComponentKind supporting the monitoring event specification model. As previously mentioned, the monitoring event specification model specifies all possible monitorable points of execution and all possible events at monitorable execution points for a ComponentKind. In addition, subscriptions to a monitoring event subscription model are authored. Each authored subscription specifies the events needed by some monitoring application. At deployment time, the subscriptions are deployed with the application. At execution time, the monitoring runtime system provides for the event generation and submission to the observer based on the submitted monitoring event subscription model.

Within the monitoring event subscription model, a number of elements are specified. These elements include an identification of the monitoring event specification model that is supported by the monitored application, identification of the monitored application, identification of the monitoring perspective the monitoring event subscription model serves, the target event bus, event data encoding, attributes, and event sources to be monitored. The target event bus specifies the locations to publish the monitoring events. The event data encoding specifies the encoder to be used on the event creation side to encode the data according to the needs of the observer. The attributes are used to provide a mechanism for providing component specific subscription modifiers.

Each event source model specifies the events to be monitored within an event source, the custom event data payload, the event filter, the quality of service required by the observer, policies, tooling hints, and author options. The customer event data payload is used to allow the subscriber to specify the subset of data needed. For example, at insurance claim approval, the available event data may be the insurance policy and the claim. This feature allows the monitoring application to express interest in receiving only the insurance claim number, the policy number, and the damage amount. The event filter is used to transform and filter the event data on the event creation side according to the needs of the subscriber. The quality of service required by the observer may include audit, same transaction, new transaction, and system management quality of service. An audit quality of service ensures that the data is always submitted to the observer. If the data is not submitted to the observer, the observed component cannot complete the transaction. In a same transaction, the events are published within the same transaction as the observed application is executing. The event may be lost if the two phase commit over the application and event bus fails. In a new transaction, the events are published within a new transaction, and not in the transaction the observed application is executing. The observed application is shielded from commit errors of the event bus. The event may be lost if the event bus fails. System management quality of service ensures that reliability is "good enough" to support load balancing and other system management metrics.

Policies specified by an event source model may include a security model, a data encryption model chosen by the subscriber, a key management model chosen by the subscriber, a performance prioritization (e.g., gold/silver model), a payload policy which governs the possibility to publish more or less data detail.

In one illustrative embodiment, the monitoring event subscription model may be implemented in a WPS business application. In WPS, the monitoring event is formalized using an extensible markup language (XML) schema. The monitoring subscriptions are XML documents conforming to this schema. Monitoring subscriptions may be authored using a graphical user interface (GUI) tool. Monitoring subscriptions are deployed together with the component (application) to which they refer. A monitoring runtime system produces the subscribed events. Events for which there are no subscribers are not generated.

Figure 3:
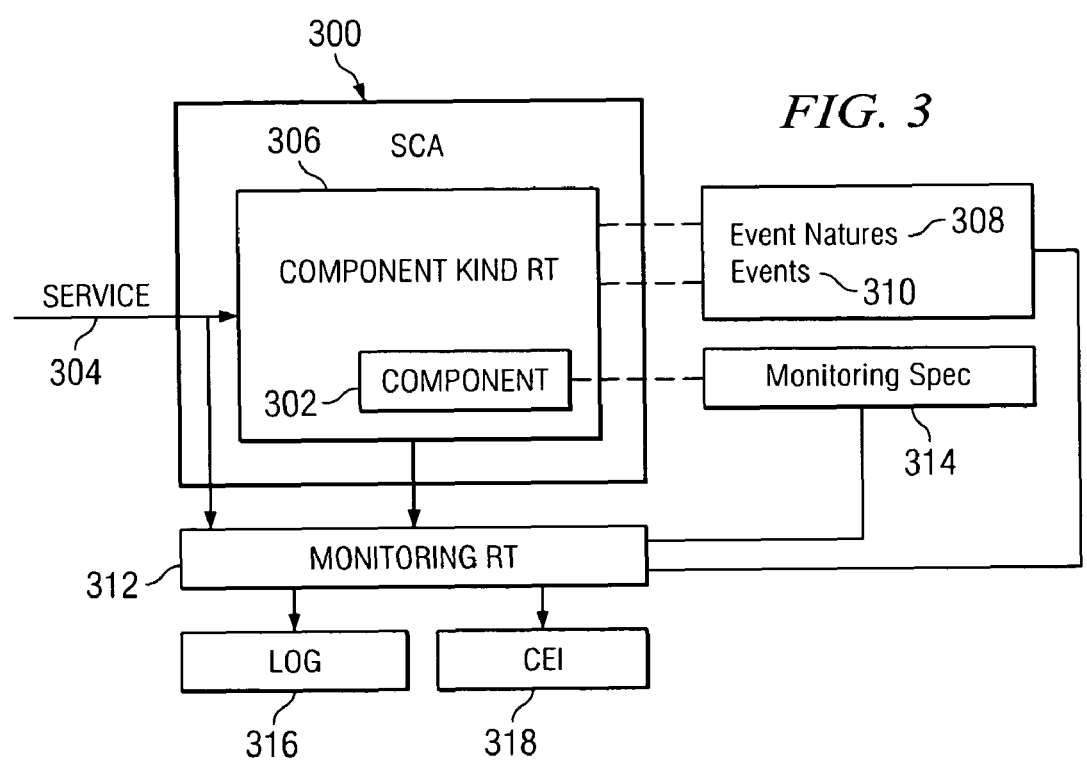
FIG. 3 is a diagram of exemplary components with which the monitoring event specification model and the monitoring event subscription model of the present invention may be implemented.

FIG. 3 is a diagram of exemplary components with which the monitoring event specification model and the monitoring event subscription model of the present invention may be implemented. The components shown in FIG. 3 may be implemented in a data processing system, such as data processing system 200 in FIG. 2. One exemplary application to which the monitoring event specification model and the monitoring event subscription model may apply is a WebSphere Process Server business application. WebSphere Process Server (WPS) is a product available from International Business Machines Corporation.

WPS business applications are composed of interacting services. In this illustrative example, a service component architecture (SCA) 300 provides a container in which components, such as component 302, may reside. Services, such as service 304, are provided by the components and made available by the service component architecture. Each component within SCA 300 is programmed/scripted in a component-kind specific way. For example, ComponentKind 306 may be scripted or programmed in a component-kind specific markup language. For each ComponentKind 306, a monitoring event specification is provided. In this example, the monitoring event specification is made up of an EventNatures 308 and Events 310 document per ComponentKind 306.

For each ComponentKind 306, the corresponding EventNatures 308 and Events 310 document pair provide observability specifications. The observability specifications define the events that are available for any component 302 of ComponentKind 306, and also specify the structure of the event data. In particular, EventNatures 308 is an XML file that specifies the monitorable points of execution and the Events 310 that can be triggered from every monitorable point. Events 310 is an XML file that specifies the data detail of each possible event for ComponentKind 306. EventNatures 308 and Events 310 documents may be provided to Monitoring Runtime 312. Monitoring Runtime 312 provides an implementation that uses the monitorable event specification model and the event subscription model to generate the required events. A program such as an authoring tool may be used by a developer to specify the required monitorable events in the form of a subscription model. Authoring is the process in which a developer may define the monitoring events that are needed. In this illustrative embodiment, authoring may include specifying required events in a monitorable subscription model from a given monitoring event specification model.

As EventNatures 308 and Events 310 are used to specify each observable point and the events that can be generated at those points, observer applications may browse the list of available events and subscribe to a subset of the available events. An observer may subscribe to a set of events using MonitoringSpec 314. MonitoringSpec 314 is an XML file that specifies which events from the list of available events are needed by the subscriber. One or more MonitoringSpecs 314 may then be provided for each component 302 that needs to be monitored. As a component executes, Monitoring Runtime 312 publishes the events specified in MonitoringSpec 314 provided. The events are published as specified in the MonitoringSpec 314 to targets such as Log 316 and the IBM-specific Common Event Infrastructure (CEI) 318. These publish targets may include, but are not limited to, message queues, electronic mail, logs, and the like.

In an illustrative embodiment, for each ComponentKind, the monitoring event specification model is implemented in two documents: an EventNatures document and an Events document. The Events document encapsulates a list of possible events for the given component. FIGS. 4A-4B and 5A-5C should be viewed together, as these figures comprise the monitoring event specification model in detail. In particular, FIGS. 4A and 4B illustrate a schema defining an EventNatures document in accordance with an illustrative embodiment of the present invention. As shown in FIG. 4A, schema 400 may be implemented as a markup language schema using a standard schema format, such as extensible schema definition (XSD) format.

In this illustrative example, schema 400 includes EventNatureSpecType 402 element, which defines the nature of each component. EventNatureSpecType 402 includes a number of elements: Property 404, ComponentKind 406, ElementKind 408. In this example, property 404 defines a quality of service for the component, which in this example may be audit 410 quality or CEI 412 quality. ComponentKind 406 defines the type of components, which in this example may be a service, a BPEL workflow, a data map, and the like.

Turning now to FIG. 4B, in this illustrative example, ElementKind 408 in FIG. 4A includes two elements: LocationPattern 420 and EventNature 422. LocationPattern 420 is a generic XPath query like construct that identifies the element kind within a component script. LocationPattern 420 includes an elementPath 424 and namePath 426 that identifies the element kind. EventNature 422 describes the monitorable points of execution, such as on ENTRY or on EXIT. EventNature 422 includes name 428 and eventName 430, which identifies the name of the event to be triggered.

As discussed above, the second document in which the monitoring event specification model is implemented is known as Events document. FIGS. 5A-5C illustrate a schema defining an Events document in accordance with an illustrative embodiment of the present invention. As shown in FIG. 5A, similar to schema 400 in FIG. 4, schema 500 may be implemented as a markup language schema using standard schema format, such as XSD format. Schema 500 includes EventSpecType 502, which defines a list of possible Events 504 for a component.

EventsType 506 defines the content for each of Events 504. EventsType 506 includes a list of Event 508. Event 508 is defined by EventType 510, in which a number of attributes are defined. These attributes include name 514, parent 516 event name, common base event attributes, such as situationType 522, situationCategory 524, and reasoningScope 526. In addition, EventType 510 includes payload 512 specification. Payload 512 specification is defined by payloadType 513, which includes a list of Data 528 elements.

Turning now to FIG. 5B, Data 528 elements may include a list of children 530. Data 528 element also includes a number of attributes: role 532, name 534, type 536. Role 532 is optional and it defines the role of the data element, such as INPUT, OUTPUT, and the like. Name 534 defines the name of the data element, for example, FailureReason. Type 536 is a required element and it defines the type of data elements, for example, a simple type, a Java™ object, or a standard data object. A simple type of noValue 538 is assigned when children 530 is specified. Other simple types that may be assigned to the Data 528 element include byte 540, short 542, int 544, long 546, float 548, double 550, string 552, dateTime 554, Boolean 556, primitive 558, businessObject 560, exception 562 as shown in FIG. 5B, and byteArray 564, shortArray 566, intArray 568, longArray 570, floatArray 572, doubleArray 574, stringArray 576, dateTimeArray 578, BooleanArray 580, primtiveArray 582, businessObjectArray 584, and hexBinary 586 as shown in FIG. 5C.

FIG. 6A illustrates an exemplary extensible markup language file representing an EventsNature document for a service in accordance with an illustrative embodiment of the present invention. This exemplary extensible markup language file utilizes an EventNatures schema, such as schema 400 in FIGS. 4A-4B. As shown in FIG. 6A, in XML file 600, EventNatureSpec 602 is defined with a name of EventNatures 603. EventNatures 603 includes property 604 with a value of "CEI" and ElementKind 606 with a name of "MethodInvocation". Thus, "MethodInvocation" is being monitored.

There are three monitorable points of executions for "MethodInvocation" represented by EventNature 608, 610, and 612. EventNature 608 specifies a monitorable point of execution on "ENTRY". EventNature 610 specifies a monitorable point of execution on "EXIT". EventNature 612 specifies a monitorable point of execution on "FAILURE". Thus, these three points of executions are to be monitored. Each of the EventNature includes the name of the event to trigger. In this example, EventNature 608 triggers an eventName "WBI.JService.MethodInvocation.ENTRY" 614. EventNature 610 triggers an eventName "WBI.JService.MethodInvocation.EXIT" 616. EventNature 612 triggers an eventName "WBI.JService.MethodInvocation.FAILURE" 618. These events are discussed in further detail in FIG. 6B.

FIG. 6B illustrates an exemplary extensible markup language file representing an Events document for a service in accordance with an illustrative embodiment of the present invention. This exemplary extensible markup language file utilizes an Events schema, such as schema 500 in FIGS. 5A-5C. As shown in FIG. 6B, in XML file 620, EventSpec 622 is defined with a name of "Events". In addition, a list of Events 624 triggered is defined, which includes Events 626, 628, 630, and 632.

Event 626 defines WBI.JService.MethodInvocation.ENTRY" 614 in FIG. 6A. Event 626 includes payload specification of "DEFAULT" 634. Within payload specification 634, data element 636 is specified. Data element 636 has "Input" role 638 and "primitive businessObject" type 640.

Event 628 defines WBI.JService.MethodInvocation.EXIT" 616 in FIG. 6A. Event 628 includes payload specification 642. Within payload specification 642, data element 644 is specified. Data element 644 has "Output" role 646 and "primitive businessObject" type 648. Event 630 is an error report.

Event 632 defines WBI.JService.MethodInvocation.FAILURE" 618 in FIG. 6A. Event 632 includes payload specification 650. Within payload specification 650, data element 652 is specified. Data element 652 has "Input" role 654 and "primitive businessObject" type 656.

Turning now to FIG. 7A, an exemplary extensible markup language file representing an EventsNature document for maps is depicted in accordance with an illustrative embodiment of the present invention. This exemplary extensible markup language file utilizes an EventNatures schema, such as schema 400 in FIGS. 4A-4B. Maps are generally used to transform data structures, for example, from a SAPCustomer object to a GenericCustomer object. As shown in FIG. 7A, in XML file 700, EventNatureSpec 702 is defined with a name of EventNatures 703. EventNatures 703 includes property 704 with a value of "CEI" and two ElementKind, ElementKind 706 and 720. ElementKind 706 has a name of "MAP". Thus, "MAP" is being monitored. ElementKind 706 includes LocationPattern 708, which specifies elementPath 710 of "/businessObjectMap" and namePath 712 of "/". LocationPattern 708 is a generic XPath query like construct that identifies the element kind with a component script.

Similar to EventNatureSpec 602 in FIG. 6A, there are three monitorable points of execution for ElementKind 706 represented by EventNatures 714, 716, and 718. EventNature 714 specifies a monitorable point of execution on "ENTRY". EventNature 716 specifies a monitorable point of execution on "EXIT". EventNature 718 specifies a monitorable point of execution on "FAILURE". Thus, these three points of execution are to be monitored. Each of the EventNature includes the name of the event to trigger. In this example, EventNature 714 triggers an eventName "WBI.MAP.ENTRY" 722. EventNature 716 triggers an eventName "WBI.MAP.EXIT" 724. EventNature 718 triggers an eventName "WBI.MAP.FAILURE" 726. These events are discussed in further detail in FIG. 7B.

On the other hand, ElementKind 720 has a name of "Transformation". Thus, "Transformation" is being monitored. Similar to ElementKind 706, ElementKind 720 includes LocationPattern 728, which specifies elementPath 730 of "/businessObjectMap/PropertyMap" and namePath 732 of "/propertyMap[@id]". In addition, there are three monitorable points of execution for ElementKind 720 represented by EventNatures 734, 736, and 738. EventNature 734 specifies a monitorable point of execution on "ENTRY". EventNature 736 specifies a monitorable point of execution on "EXIT". EventNature 738 specifies a monitorable point of execution on "FAILURE". Thus, these three points of execution are to be monitored. Each of the EventNature includes the name of the event to trigger. In this example, EventNature 734 triggers an eventName "WBI.MAP.Transformation.ENTRY" 740. EventNature 736 triggers an eventName "WBI.MAP.Transformation.EXIT" 742. EventNature 738 triggers an eventName "WBI.MAP.Transformation.FAILURE" 744. These events are discussed in further detail in FIG. 7B.

FIG. 7B is a diagram illustrating an exemplary extensible markup language file representing an Events document for maps in accordance with an illustrative embodiment of the present invention. This exemplary extensible markup language file utilizes an Events schema, such as schema 500 in FIGS. 5A-5C. As shown in FIG. 7B, in XML file 750, EventSpec 752 is defined with a name of "Events". In addition, a list of Events 754 triggered is defined, which includes Events 756-768.

Event 756 defines WBI.MAP.ENTRY" 722 in FIG. 7A. Event 756 has a parent event "WBI.Monitoring.Event" 755 and includes payload specification 770. Within payload specification 770, data element 772 is specified. Data element 772 has "Input" role 774 and "businessObject" type 776.

Event 758 defines WBI.MAP.EXIT" 724 in FIG. 7A. Event 758 has a parent event "WBI.Monitoring.Event" 759 and includes payload specification 778. Within payload specification 778, data element 780 is specified. Data element 780 has "Output" role 782 and "businessObject" type 784.

Event 768 defines WBI.MAP.FAILURE" 726 in FIG. 7A. Event 768 has a parent event "WBI.ER" 769 and includes payload specification 786. Within payload specification 786, data elements 788 and 790 are specified. Data element 788 has "Input" role 792 and "primitive businessObject" type 794. Data element 790 has "Output" role 796 and "primitive businessObject" type 798.

Event 760 defines WBI.MAP.Transformation.ENTRY" 740 in FIG. 7A. Event 760 has a parent event "WBI.Monitoring.Event" 761 and includes payload specification 763 of "DEFAULT". Within payload specification 763, data element 765 is specified. Data element 765 has "Input" role 767 and "primitive businessObject" type 771.

Event 762 defines WBI.MAP.Transformation.EXIT" 742 in FIG. 7A. Event 762 has a parent event "WBI.Monitoring.Event" 773 and includes payload specification 775. Within payload specification 775, data element 777 is specified. Data element 777 has "Output" role 779 and "primitive businessObject" type 781.

Event 764 defines WBI.MAP. Transformation.FAILURE" 744 in FIG. 7A. Event 764 has a parent event of "WBI.Monitoring.Event" 783 and includes payload specification 785. Within payload specification 785, data elements 787, 789, and 791 are specified. Data element 787 has "Input" role 793 and "primitive businessObject" type 795. Data element 789 has "Output" role 797 and "primitive businessObject" type 799. Data element 791 has "Exception" role 711 and "exception" type 713. Event 766 defines an error report.

FIGS. 8A and 8B illustrate a schema formalizing a monitoring event subscription model in accordance with an illustrative embodiment of the present invention. Schema 800 may be implemented as a markup language schema using a standard schema format, such as extensible schema definition (XSD) format.

In this illustrative example, schema 800 includes Monitor 802 element, which specifies the name of the subscription model. Monitor 802 includes a number of elements, such as EnableDefaultEvents 804, Attributes 806 defined by MapType 808, Perspective 810, and EventSource 812 defined by EventSourceType 814. EventSourceType 814 element defines the type of event source of each component. EventSourceType 814 includes a number of elements: name 816, property 818, and event 820. In this example, name 816 specifies the name of the event source type. Property 818 defines a quality of service for the component, which in this example may be audit 822 quality, persistent 824 quality, CEI 826 quality, or queryable 828 quality.

Event 820 is defined by EventType 830. As shown in FIG. 8B, EventType 830 element includes a number of attributes: name 832, label 834, active 836, payload 838, and tx 840 which is defined by TXType 842. Payload 838 defines the subset of data in which the subscriber has specified an interest.

TXType 842 element defines the transaction type. TxType 842 includes enumeration values 844 specifying the type of transaction. For example, the enumeration values may include a Same transaction, a New transaction, or No transaction. MapType 808 includes Entry 846 element defined by AssociationType 848. AssociationType 848 includes attributes key 850 and value 852.

Turning now to FIG. 9, a diagram illustrating an exemplary extensible markup language file representing an event subscription is depicted in accordance with an illustrative embodiment of the present invention. This exemplary extensible markup language file utilizes a monitoring event subscription model schema, such as schema 800 in FIGS. 8A-8B.

In this illustrative example, in XML file 900, Monitor 902 is defined with a name of ClarifyToGenericAddress 904. Monitor 902 includes EventSource 906 with a value of "MAP:/" and its defined Event 908 for the source. Thus, "MAP:/" is monitored as the source of the event, and Event 908 specifies the attributes for the event. If event "Failure" 910 is generated from event source "MAP:/" in a new transaction (tx 912), then payload "Digest" 914 will be provided to the subscriber.

Monitor 902 also includes EventSource 916 with a value of "Transformation" and its defined Events 918, 920, and 922. If event "Failure" 918 is generated from event source "Transformation" in a new transaction (tx 924), then payload "Digest" 926 will be provided to the subscriber. Likewise, if event "Entry" 920 or event "Exit" 922 is generated from event source "Transformation", then payload "Digest" 928 or 930 will be provided to the subscriber.

The invention can take the form an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for defining monitorable events in a context of execution of a monitored component, the computer implemented method comprising:

having a computer usable program stored in a computer readable storage medium when executed with a computer system carrying out the further steps;

identifying monitorable points of execution for the monitored component of a particular component type to form identified monitorable points, wherein events are generated at the identified monitorable points during execution of the monitored component, and wherein the component type comprises a service, business process execution language workflow, or a data map;

specifying the events generated in the identified monitorable points to define the monitorable events in a monitoring event specification model, wherein the monitoring event specification model comprises a first extensible markup language document specifying the monitorable points of execution and possible events triggered from each monitorable point for the monitored component of the particular component type and a second extensible markup language document specifying data elements for each possible event for the monitored component of the particular component type, and wherein the monitoring event specification model specifies the particular component type of the monitored component being monitored, element types being monitored, and data associated with the element types being monitored;

receiving, from a subscriber, a subscription to a subset of the events to form subscribed events; and responsive to an occurrence of the subscribed events, sending monitorable event data to the subscriber.

2. The computer implemented method of claim 1, wherein the subscribing step is performed using a monitoring event subscription.

3. The computer implemented method of claim 2, wherein a monitoring event subscription is deployed with the monitored component.

4. The computer implemented method of claim 1, wherein the monitoring event subscription is implemented using a monitoring event subscription model, and the monitoring event subscription model comprises an identification of a monitoring event specification model supported by the monitored component, an identification of the monitored component, an identification of a monitoring perspective the monitoring event subscription model serves, a target event bus, an event data encoding, attributes, and event sources to be monitored.

5. The computer implemented method of claim 4, wherein the monitorable event specification model and the monitoring event subscription model are used in a monitoring runtime implementation to generate the events.

6. The computer implemented method of claim 4, wherein an authoring tool is used to author the monitorable event subscription model from the monitoring event specification model.

7. The computer implemented method of claim 1, wherein each element type is defined by a name, properties, a location pattern, and event nature.

8. The computer implemented method of claim 7, wherein the location pattern is a generic Xpath query construct that identifies the element type within a component script.

9. The computer implemented method of claim 1, wherein each possible event is defined by a name, a parent event name, a payload specification, and common base event attributes.

10. The computer implemented method of claim 1, wherein each data element is defined by a role, a name, and a type.

11. The computer implemented method of claim 1, wherein the monitoring event specification model is implemented at transitional points within and around traditional stacks that host business solutions in a heterogeneous environment.

12. A data processing system for defining monitorable events in a context of execution of a monitored component, the data processing system comprising:

a bus;

a storage device connected to the bus, wherein the storage device contains computer usable code;

at least one managed device connected to the bus;

a communications unit connected to the bus; and a processing unit connected to the bus, wherein the processing unit executes the computer usable code to identify monitorable points of execution for the monitored component of a particular component type to form identified monitorable points, wherein events are generated at the identified monitorable points during execution of the monitored component, and wherein the component type comprises a service, business process execution language workflow, or a data map, and specify the events generated in the identified monitorable points to define the monitorable events in a monitoring event specification model, wherein the monitoring event specification model comprises a first extensible markup language document specifying the monitorable points of execution and possible events triggered from each monitorable point for the monitored component of the particular component type and a second extensible markup language document specifying data elements for each possible event for the monitored component of the particular component type, and wherein the monitoring event specification model specifies the particular component type of the monitored component being monitored, element types being monitored, and data associated with the element types being monitored, wherein the processing unit further executes the computer usable code to receive, from a subscriber, a subscription to a subset of the monitorable events to form subscribed events, and send monitorable event data to the subscriber in response to an occurrence of the subscribed events.

13. A computer program product for defining monitorable events in a context of execution of a monitored component, the computer program product comprising:

a computer readable storage medium having computer usable program code stored thereon, the computer usable program code comprising:

computer usable program code for identifying monitorable points of execution for the monitored component of a particular component type to form identified monitorable points, wherein events are generated at the identified monitorable points during execution of the monitored component, and wherein the component type comprises a service, business process execution language workflow, or a data map;

computer usable program code for specifying the events generated in the identified monitorable points to define the monitorable events in a monitoring event specification model, wherein the monitoring event specification model comprises a first extensible markup language document specifying the monitorable points of execution and possible events triggered from each monitorable point for the monitored component of the particular component type and a second extensible markup language document specifying data elements for each possible event for the monitored component of the particular component type, and wherein the monitoring event specification model specifies the particular component type of the monitored component being monitored, element types being monitored, and data associated with the element types being monitored;

computer usable program code for receiving, from a subscriber, a subscription to a subset of the monitorable events to form subscribed events; and computer usable program code for sending monitorable event data to the subscriber in response to an occurrence of the subscribed events.

14. The computer implemented method of claim 1, wherein the element types comprise at least one of a public method of service or an assignment of a variable.

15. The computer implemented method of claim 1, wherein the monitorable points of execution comprise an entry point or exit point of the monitored component.

* * * * *